(12) United States Patent
Andre Poyaud

(10) Patent No.: US 8,594,267 B2
(45) Date of Patent: Nov. 26, 2013

(54) METHOD FOR SELECTING A LOADING MAP FOR A NUCLEAR REACTOR CORE, CORRESPONDING SELECTION SYSTEM, COMPUTER PROGRAM AND STORAGE MEDIUM

(75) Inventor: Gilles Andre Poyaud, Lyons (FR)

(73) Assignee: Areva NP, Courbevoie (FR)

( * ) Notice: Subject to any disclaimer, the term of this patent is extended or adjusted under 35 U.S.C. 154(b) by 1017 days.

(21) Appl. No.: 12/704,377

(22) Filed: Feb. 11, 2010

(65) Prior Publication Data

US 2010/0208858 A1 Aug. 19, 2010

(30) Foreign Application Priority Data

Feb. 12, 2009 (FR) ........................................ 95 0883

(51) Int. Cl.
*G21C 19/00* (2006.01)

(52) U.S. Cl.
USPC ............ 376/267; 376/260; 376/261; 376/264

(58) Field of Classification Search
USPC .................. 376/260, 261, 264, 267, 908, 917
See application file for complete search history.

(56) References Cited

U.S. PATENT DOCUMENTS

| 7,224,761 | B2 * | 5/2007 | Popa | ............................ 376/267 |
| 2006/0109944 | A1 | 5/2006 | Popa | |
| 2006/0269034 | A1 * | 11/2006 | Sutton et al. | .................. 376/267 |

FOREIGN PATENT DOCUMENTS

| EP | 0 789 782 A | 7/1997 |
| EP | 1 524 674 A1 | 4/2005 |
| EP | 1 615 232 A2 | 1/2006 |

* cited by examiner

*Primary Examiner* — Jack W Keith
*Assistant Examiner* — Marshall O'Connor
(74) *Attorney, Agent, or Firm* — Davidson, Davidson & Kappel, LLC

(57) ABSTRACT

A method for selecting a loading map for a nuclear reactor core including the following steps: a) providing production data relating to the nuclear fuel assemblies, b) providing neutron data which are representative of the operation of the core, c) calculating the three-dimensional distribution of the local power in the core, d) calculating the extreme value reached by at least one thermomechanical parameter within the nuclear fuel assemblies, and e) selecting, in accordance with the extreme values calculated, a loading map from the loading maps envisaged.
A system, computer program and storage medium for selecting a loading map for a nuclear reactor.

14 Claims, 3 Drawing Sheets

METHOD FOR SELECTING A LOADING MAP FOR A NUCLEAR REACTOR CORE, CORRESPONDING SELECTION SYSTEM, COMPUTER PROGRAM AND STORAGE MEDIUM

This application claims priority to French application FR 09 50883, filed on Feb. 12, 2009, the entire disclosure of which is incorporated by reference herein.

The present invention relates to a method for selecting a loading map for a nuclear reactor core.

The invention is used, for example, in pressurized water nuclear reactors.

BACKGROUND

In conventional manner, the core of such a reactor is loaded with more than a hundred juxtaposed nuclear fuel assemblies.

Each assembly comprises a bundle of nuclear fuel rods, the rods each having a cladding which surrounds nuclear fuel pellets.

The operation of a nuclear reactor is carried out in the form of cycles, at the end of which the nuclear fuel assemblies of the core are replaced, for example, in thirds.

In this manner, at the end of an operating cycle, for example, one third of the nuclear fuel assemblies present in the core are removed, two thirds of the nuclear fuel assemblies in the core are moved and a new third of nuclear fuel assemblies are introduced so that they are subjected to the following operating cycle.

Conventionally, the loading map, that is to say, the arrangement of the nuclear fuel assemblies within the core, is selected from a plurality of loading maps envisaged in order to produce the maximum amount of energy during the future operating cycle. This selection is brought about, for example, by the operator of the nuclear reactor, using computer programs which involve neutron calculation software.

By way of example, documents EP-786 782 and U.S. Pat. No. 7,224,761 describe methods for neutron optimization of loading maps.

After determining a loading map which is acceptable on the basis of neutron criteria, it must be verified that, the loading map envisaged does not involve any risk of exceeding the long-term thermomechanical limits within the nuclear fuel assemblies. Exceeding such limits in this manner could lead in particular to occurrences of thermal instability within the core.

This verification is generally provided by the designer of the fuel assembly taking into account a notional rod which would be subjected to a local power level greater than all the local power levels of the rods, regardless of the time of the cycle in question; this is referred to as an envelop power history. The duration of such a verification is in the order of from two to three days. After the loading map selected on the basis of neutron criteria is confirmed with respect to the thermomechanical criteria, the operator of the nuclear power station produces a report showing compliance with the safety parameters of the reactor so that the safety authorities definitively validate the loading map selected.

SUMMARY OF THE INVENTION

Use of nuclear reactors is increasingly demanding, in particular with increases in the duration of operating cycles. It is further desirable to be able to best use the capacities of the reactors and the nuclear fuel assemblies which are loaded therein.

An object of the invention is to overcome this problem, by providing a method for selecting a loading map of a nuclear reactor core which allows the nuclear fuel assemblies to be better used whilst ensuring safe operation.

The invention provides a method for selecting a loading map for a nuclear reactor core from a plurality of envisaged loading maps, the core comprising nuclear fuel assemblies, each assembly comprising nuclear fuel rods where nuclear fuel is enclosed in a cladding, the method comprising the following steps:
a) providing production data relating to the nuclear fuel assemblies,
b) providing neutron data which are representative of the past operation of the core of the nuclear reactor and the future operation thereof at least during the next operating cycle,
c) calculating, using an item of neutron calculation software and based on the production data and neutron data, the three-dimensional distribution of the local power in the core during future operation for each loading map envisaged,
d) calculating, using an item of thermomechanical calculation software and based on the calculated distribution of local power, the extreme value reached by at least one thermomechanical parameter within the nuclear fuel assemblies for each loading map envisaged,
e) selecting, in accordance with the extreme values calculated, a loading map from the loading maps envisaged.

According to specific embodiments, the method may comprise one or more of the following features, taken in isolation or according to any technically possible combination:

step d comprises the following sub-steps:
d1) identifying at least one rod for which the value of the thermomechanical parameter is capable of being the extreme value from the rods of the nuclear fuel assemblies;
d2) calculating using the thermomechanical calculation software the extreme values reached by the thermomechanical parameter for the rod(s) identified;

step d1) is carried out using an item of sorting software;

the sorting software uses interpolations or correlations established from the thermomechanical calculation software;

the thermomechanical parameter is representative of the stress state in a cladding;

the thermomechanical parameter is the pressure inside the cladding and the extreme value calculated is the maximum value of the pressure;

the thermomechanical parameter is representative of the corrosion state of a cladding;

the thermomechanical parameter is a thickness of oxide on the cladding and the extreme value calculated is the maximum value of the thickness of oxide;

steps c) and d) are carried out in a time period of less than one week for each loading map envisaged;

steps c) and d) are executed in a time period of less than one day for each loading map envisaged; and a step f) for loading the core in accordance with the loading map selected.

The invention also provides a system for selecting a loading map of a nuclear reactor core, characterized in that it comprises means for implementing the steps of a method as defined above.

According to one embodiment of the invention, the system comprises at least one data-processing unit and storage means in which there is/are stored at least one programme for carrying out steps of the selection method used by the system.

The invention further provides a computer program which comprises instructions for carrying out the steps of a method as defined above.

The invention also provides a storage medium which can be used in a computer and on which a program as defined above is recorded.

BRIEF DESCRIPTION OF THE DRAWINGS

The invention will be better understood from a reading of the following description, given purely by way of example and with reference to the appended drawings, in which.

DETAILED DESCRIPTION

Figure 1:
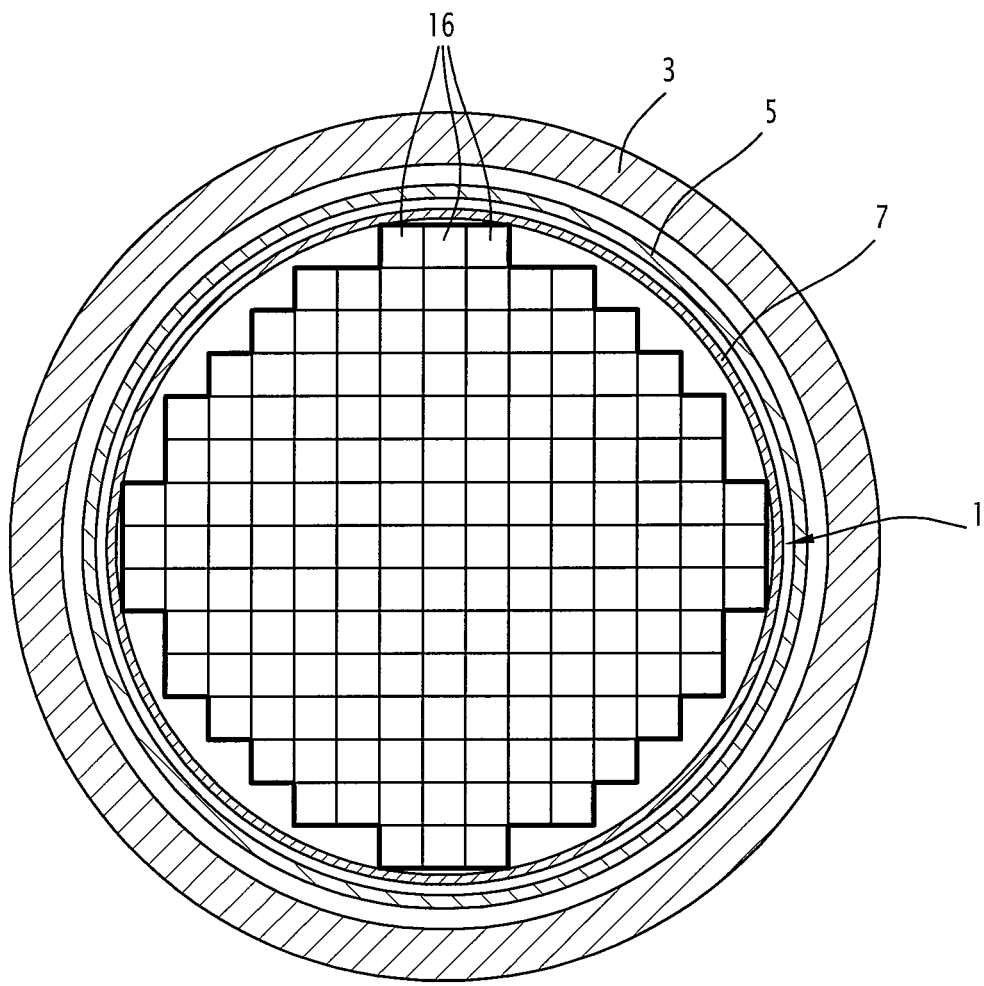
FIG. 1 is a schematic horizontal section illustrating a pressurized water nuclear reactor core.

FIG. 1 is a schematic illustration of a pressurized water nuclear reactor core 1, it being understood that the invention can apply to other types of reactor.

It is possible to see the vessel 3 of the nuclear reactor, a thermal screen 5 and the barrel 7 of the core 1 inside which nuclear fuel assemblies 16 are arranged. The assemblies 16 are orientated vertically and juxtaposed. They are indicated with squares in FIG. 1.

Typically, the core 1 comprises more than a hundred fuel assemblies 16, for example, 157 for a reactor of 900 MWe.

Figure 2:
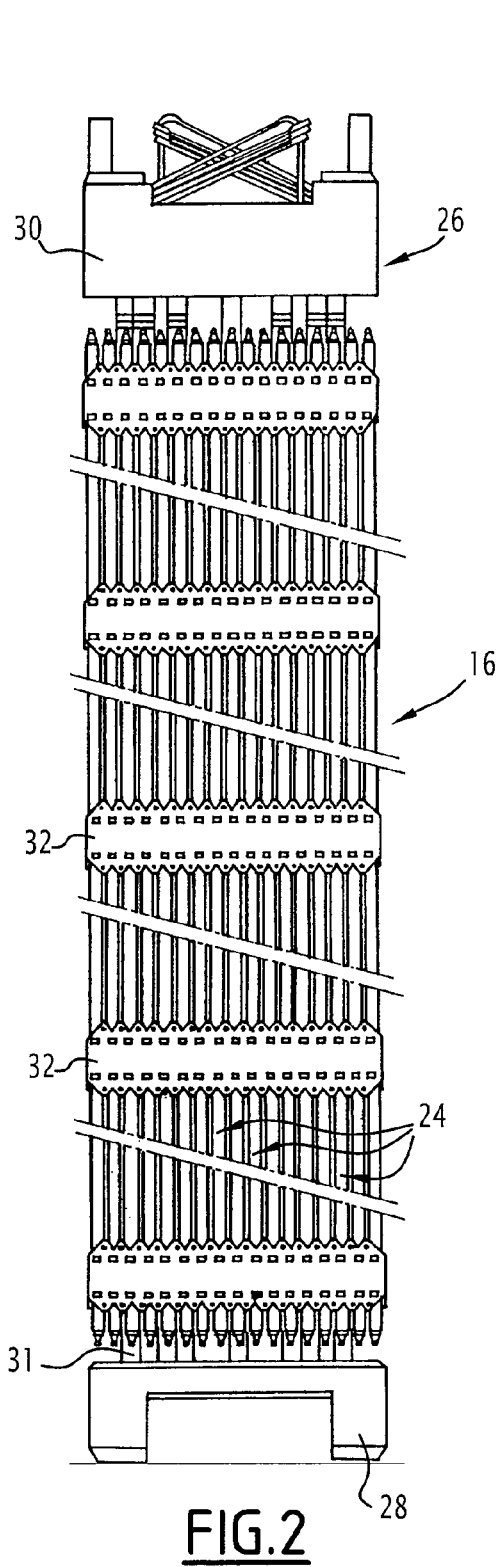
FIG. 2 is a schematic side view of a nuclear fuel assembly of the core of FIG. 1.

As illustrated in FIG. 2, each assembly 16'comprises in conventional manner a network of nuclear fuel rods 24 and a skeleton 26 for supporting the rods 24.

The skeleton 26 conventionally comprises a bottom nozzle 28, an upper nozzle 30, guide tubes 31 which connect the two nozzles 28 and 30 and which are intended to receive rods of the control clusters of the reactor and spacer grids 32.

Figure 3:
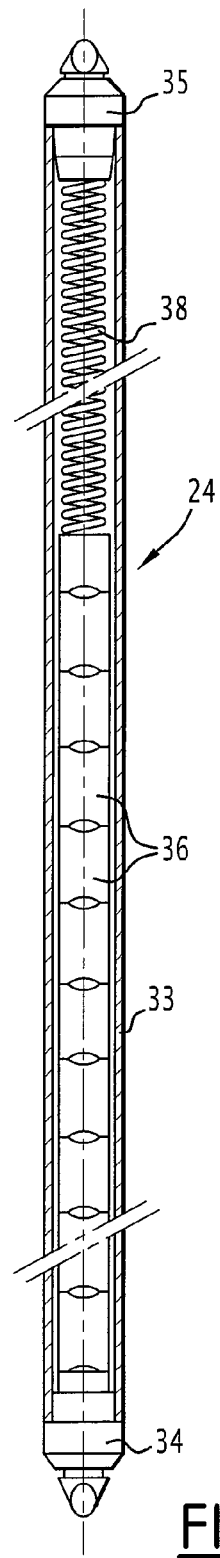
FIG. 3 is a schematic longitudinal section of a fuel rod of the assembly of FIG. 2.

As illustrated in FIG. 3, each fuel rod 24 comprises in conventional manner, a cladding 33 in the form of a tube which is closed at the lower end thereof by a bottom end plug 34 and at the upper end thereof by a top end plug 35. The rod 24 comprises a series of pellets 36 which are stacked in the cladding 33 and are in abutment against the bottom end plug 34. A retention spring 38 is arranged in the upper portion of the cladding 33 in order to abut against the upper end plug 35 and the upper pellet 36.

Conventionally, the pellets 36 are based on uranium oxide and the cladding 33 is of zirconium alloy.

Figure 4:
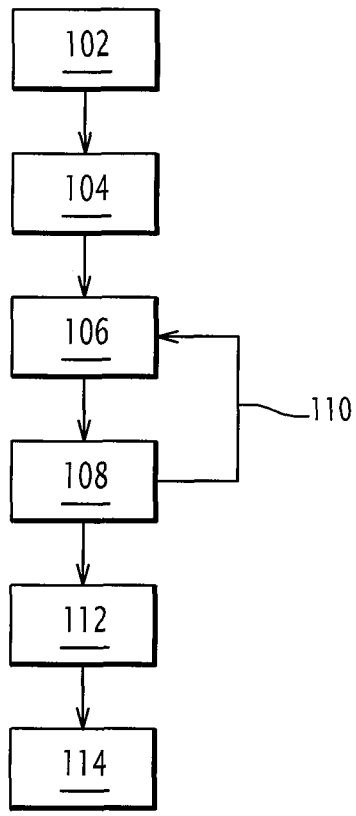
FIG. 4 is a flow chart illustrating successive steps of a method for selecting a loading map according to the invention.

FIG. 4 illustrates the various steps of a method for selecting a loading map for the nuclear fuel assemblies 16 within the core 1 in order to implement a future operating cycle of the reactor. This selection is carried out from a plurality of loading maps envisaged.

A loading map comprises in particular the positions which the various nuclear fuel assemblies 16 must occupy and therefore indicates how to move the nuclear fuel assemblies 16 which are already present during the preceding operating cycle and which have to carry out one or more additional operating cycles and/or load the new nuclear fuel assemblies 16 in accordance with their characteristics.

Figure 5:
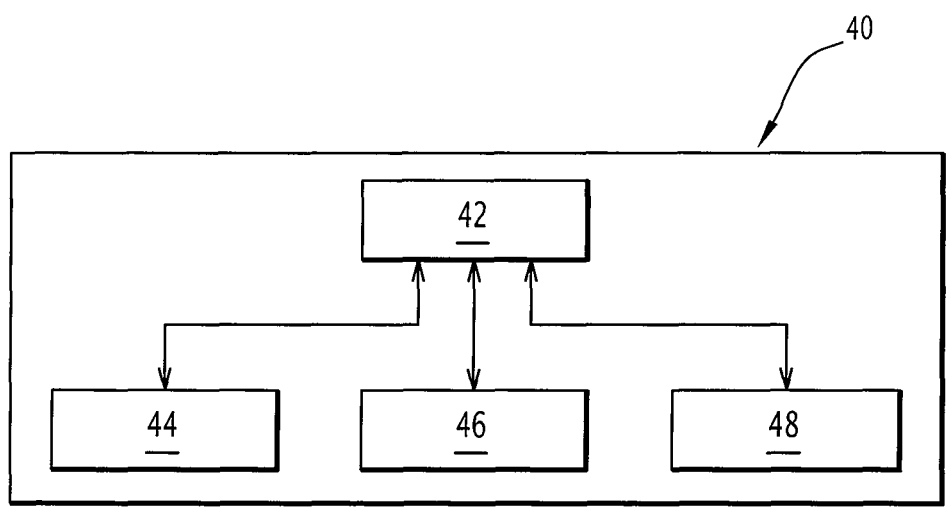
FIG. 5 is a schematic view illustrating a data-processing system for implementing the method of FIG. 4.

The method for selecting the loading map is implemented using a data-processing system 40, which is illustrated in FIG. 5 and which comprises, for example, a data-processing unit 42 which comprises one or more processor(s), data storage means 44, input/output means 46 and optionally display means 48. The storage means 44 which comprise, for example, one or more memory/ies, store one or more computer program(s) which involve various items of software in order to carry out the steps described below. The loading maps envisaged have, for example, been stored therein.

In step 102, production data are provided relating to the nuclear fuel assemblies 16 which will be present in the future operating cycle of the core 1. These production data typically comprise, for each assembly 16, information relating to:

the dimensions of the various elements which constitute the assembly 16, the material(s) used, for example, to constitute the claddings 33 of the rods 24, the nuclear fuel(s) that the rods 24 contain, in particular in terms of the nature of the fissile material, enrichment and optionally neutron poisons.

These production data are, for example, stored in the storage means 44.

In step 104, neutron data are provided which are representative of the past operation of the core 1 of the nuclear reactor and the future operation envisaged, in particular during the future operating cycle. The data relating to the past operation can be real data, for example, measured during previous operating cycles using different sensors present in the nuclear reactor. These may also be notional power records simulated by an item of neutron calculation software such as that used in the following steps of the selection method of the loading map. The neutron data are, for example, stored in the storage means 44.

During step 106, for an envisaged loading map, the system 40 will calculate, using an item of neutron calculation software, and using the production data and the neutron data provided in steps 102 and 104, the three-dimensional distribution of the local power in the core 1 during the future operation envisaged.

The item of neutron calculation software used, may be an item of software of conventional type, for example, the software SMART from the company AREVA NP (registered trade mark). This neutron calculation software is, for example, stored in the storage means 44 of the system 40.

Then in step 108, the system 40 will calculate, using an item of thermomechanical calculation software, from the distribution of the local power calculated in step 106 and the production data provided in step 102, the internal pressure Pint inside the claddings 33 of the rods 24 of all the assemblies 16 which will be present in the core 1 during the future operating cycle.

The calculation of step 108 can be carried out in two sub-steps.

In a first sub-step, the system 40 will identify the rod(s) 24 which is/are the most loaded in each of the assemblies 16 of the core 1 during the future operating cycle, that is to say, the rod(s) 24 of each assembly 16 which are subjected to the greatest internal pressure Pint.

This identification can be carried out using an item of sorting software which, rather than carrying out explicit calculations in order to solve the different applicable equations, will determine the Pint values for the different rods 24 by means of correlation from the known Pint values for known conditions (linear power, combustion rate, etc.). The known Pint values originate, for example, from a database which is constructed from an item of thermomechanical calculation software and stored in the storage means 44. This may be a conventional item of software, such as the software COPERNIC from the company AREVA NP (registered trade mark).

The sorting software used is preferably a simplified version of the same item of thermomechanical calculation software as that used to construct the database and for step 108, since the use of software based on the same models allows the strength and the reliability of the method to be increased.

The use of correlations, rather than explicit calculations, allows the rod(s) 24 which will be the most loaded to be identified in a shorter period of time.

In a variant, it is possible to use interpolations rather than correlations.

Then, in a second sub-step of step 108, the system 40 carries out the complete thermomechanical calculations on the rod(s) 24 identified during the first sub-step of step 108. These calculations are carried out using an item of thermomechanical calculation software of conventional type, for example, the software COPERNIC from the company AREVA NP. These complete thermomechanical calculations carried out on the various rods 24 identified allow the maximum Pint value to be determined within the core 1 during the future operating cycle.

In a variant, step 108 can be carried out on only a portion of the assemblies 16 of the core, for example, only on those having already been irradiated during a previous operating cycle. The maximum Pint values will normally be reached within such assemblies 16 rather than in new assemblies 16.

As illustrated by the arrow 110, the steps 106 and 108 are repeated for all of the loading maps envisaged for the future operating cycle.

In a variant, it is possible to calculate the power distributions in the core 1 for a plurality of loading maps envisaged during the same step 106, then to calculate the maximum corresponding Pint values for each of these loading maps during step 108.

Then, in a step 112, a loading map will be selected from the different loading maps envisaged. This selection is carried out in accordance with the maximum Pint values calculated for each loading map envisaged.

In this manner, in this step 112, the maximum Pint values calculated are compared with the admissible limit value Plim for Pint. The loading maps which would cause this limit value Plim to be exceeded are eliminated.

From the remaining loading maps, it is possible to select, for example, the one which is closest to the limit value Plim, which will allow best use of the nuclear fuel assemblies 16. It is also possible to select a loading map which places less stress upon the claddings 33, in order to retain a greater safety margin. The selection can also be carried out using other criteria, for example, of the neutron type.

Then, in step 114, the core 1 of the nuclear reactor is loaded in accordance with the loading map selected in step 112.

It can be seen that this last step will normally be implemented after validation by the relevant safety authorities of the loading map selected. The validation is carried out on the basis of a report which indicates that the loading map proposed allows the safety parameters of the reactor to be complied with for the entire duration of the future operating cycle.

The selection of the loading map therefore allows not only neutron criteria to be taken into account, as in the prior art, but also thermomechanical criteria. Therefore, this selection can be optimized with respect to long-term thermomechanical limits which are fixed for the nuclear fuel assemblies 16.

Since the thermomechanical calculations are not carried out on a notional rod 24, as in the prior art, the maximum Pint value calculated is found to be much closer to the real maximum value which it envelops without excessive conservatism, so that the assemblies 16 can be much better used.

The method described above can be used by the operator of the nuclear reactor to which the necessary items of software have been submitted in their binary execcutable form and are thus stored in the storage means 44 of the system 40 of the operator. The operator therefore no longer needs to turn to the manufacturer of the assemblies 16 in order to carry out thermomechanical calculations. He is capable, in step 112, of carrying out himself the selection of the loading map based on the maximum Pint values determined in step 108 and optionally other data, for example, neutron data.

In contrast to a complete calculation of the thermomechanical parameters for all the rods 24 which would take from two to three weeks, the calculations of step 108 are carried out on a limited number of rods and therefore quickly, preferably in less than one week, and even more preferably in less than one day, for each loading map. In this manner, the operator is capable of assessing the relevance of a plurality of loading maps within reasonable periods of time.

Some steps of the method above and in particular steps 112 and 114 are not necessarily carried out by the data-processing system 40.

Furthermore, other long-term thermomechanical parameters than the pressure Pint can be calculated in step 108.

These may be, for example, parameters relating to the state of stress in the claddings 33 other than the pressure Pint. They may also be thermomechanical parameters relating to the corrosion state of the claddings 33, for example, the thickness of oxide.

In some cases, the extreme values calculated in step 108 will not be the maximum values, but instead the minimum values.

In the same manner, step 108 is not necessarily carried out in two sub-steps. This is in particular the case when the thermomechanical parameter calculated relates to the corrosion state of the claddings 33.

In this instance, the step 108 can be carried out by a complete calculation using the thermomechanical calculation software on all the rods 24 of the nuclear fuel assemblies 16 in a prior sub-step for sorting.

What is claimed is:

1. A method for selecting a loading map for a nuclear reactor core from a plurality of envisaged loading maps, the core comprising nuclear fuel assemblies, each assembly comprising nuclear fuel rods where nuclear fuel is enclosed in a cladding, the method comprising the following steps:
   a) providing production data relating to the nuclear fuel assemblies,
   b) providing neutron data which are representative of a past operation of the core of the nuclear reactor and a future operation, the future operation being at least during a next operating cycle,
   c) calculating a three-dimensional distribution of a local power in the core during the future operation for each of the plurality of envisaged loading maps by using a neutron calculation software, the production data and the neutron data,
   d) calculating an extreme value reached by at least one thermomechanical parameter within the nuclear fuel assemblies for each of the plurality of envisaged loading maps by using a thermomechanical calculation software and the calculated distribution of the local power, and
   e) selecting a loading map from the plurality of envisaged loading maps in accordance with the extreme values calculated.

2. The method as recited in claim 1 wherein step d) comprises the following sub-steps:
   d1) identifying at least one rod for which a value of the at least one thermomechanical parameter is the extreme value from the rods of the nuclear fuel assemblies,
   d2) calculating the extreme values reached by the at least one thermomechanical parameter for the rod(s) identified using the thermomechanical calculation software.

3. The method as recited in claim 2 wherein step d1) is carried out using sorting software.

4. The method as recited in claim 3 wherein the sorting software uses interpolations or correlations established from the thermomechanical calculation software.

5. The method as recited in claim 1 wherein the at least one thermomechanical parameter is representative of a stress state in the cladding.

6. The method as recited in claim 5 wherein the at least one thermomechanical parameter is a pressure inside the cladding and the extreme value calculated is a maximum value of the pressure.

7. The method as recited in claim 1 wherein the at least one thermomechanical parameter is representative of a corrosion state of the cladding.

8. The method as recited in claim 7 wherein the at least one thermomechanical parameter is a thickness of oxide on the cladding and the extreme value calculated is a maximum value of the thickness of oxide.

9. The method as recited in claim 1 wherein steps c) and d) are carried out in less than one week for each of the plurality of envisaged loading maps.

10. The method as recited in claim 9 wherein the steps c) and
   d) are carried out in less than one day for each of the plurality of envisaged loading maps.

11. The method as recited in claim 1 further comprising a step
   f) for loading the core in accordance with the selected loading map.

12. A system for selecting a loading map of the nuclear reactor core, comprising a device programmed to implement the steps of the method as recited in claim 1.

13. The system as recited in claim 12 wherein the device includes at least one data-processing unit and a storage medium the storage medium storing at least one program for carrying out the steps of the selection method used by the system.

14. A non-transitory computer readable medium comprising a computer program comprising instructions for carrying out the steps of the method as recited in claim 1.

* * * * *